United States Patent
Nakano et al.

(10) Patent No.: US 10,169,874 B2
(45) Date of Patent: Jan. 1, 2019

(54) SURFACE-BASED OBJECT IDENTIFICATION

(71) Applicant: INTERNATIONAL BUSINESS MACHINES CORPORATION, Armonk, NY (US)

(72) Inventors: Hiroki Nakano, Otsu (JP); Yasushi Negishi, Tokyo (JP); Masaharu Sakamato, Yokohama (JP); Taro Sekiyama, Urayasu (JP); Kun Zhao, Funabashi (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/608,814

(22) Filed: May 30, 2017

(65) Prior Publication Data
US 2018/0350063 A1    Dec. 6, 2018

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2200/04* (2013.01); *G06T 2207/20081* (2013.01); *G06T 2207/20084* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,952,710 B2* | 10/2005 | Pelton | ............... | G06F 7/535 708/502 |
| 7,043,064 B2* | 5/2006 | Paik | .................. | G06K 9/48 128/922 |
| 7,058,210 B2* | 6/2006 | Mundy | ................ | A61B 6/00 382/128 |
| 7,529,395 B2* | 5/2009 | Cathier | ............. | G06K 9/4671 128/922 |
| 7,574,024 B2* | 8/2009 | Bitter | ................. | G06T 15/08 382/128 |
| 8,577,129 B2 | 11/2013 | Reeves et al. | | |
| 9,639,949 B2* | 5/2017 | Karanam | .............. | G06T 7/13 |
| 2003/0095692 A1* | 5/2003 | Mundy | ................ | A61B 6/00 382/128 |
| 2004/0109603 A1* | 6/2004 | Bitter | ................. | G06T 15/08 382/154 |
| 2006/0120591 A1* | 6/2006 | Cathier | ............. | G06K 9/4671 382/154 |
| 2006/0290695 A1* | 12/2006 | Salomie | ............. | G06T 17/20 345/420 |

(Continued)

FOREIGN PATENT DOCUMENTS

CN    105809730 A    7/2016

OTHER PUBLICATIONS

Hua et al., "Computer-aided classification of lung nodules on computed tomography images via deep learning technique", Onco Targets and Therapy, Dove Press Journal, Aug. 4, 2015, pp. 1-8.

(Continued)

*Primary Examiner* — Anand P Bhatnagar
(74) *Attorney, Agent, or Firm* — Kristofer L. Haggerty

(57) ABSTRACT

A target object may be identified by estimating a distribution of a plurality of orientations of a periphery of a target object, and identifying the target object based on the distribution.

13 Claims, 13 Drawing Sheets

(56) References Cited

U.S. PATENT DOCUMENTS

| | | | |
|---|---|---|---|
| 2008/0002873 A1* | 1/2008 | Reeves | G06T 7/0012 |
| | | | 382/133 |
| 2009/0080747 A1* | 3/2009 | Lu | G06T 7/0012 |
| | | | 382/131 |
| 2010/0074499 A1* | 3/2010 | Wels | G06T 7/11 |
| | | | 382/131 |
| 2011/0222779 A1* | 9/2011 | Karanam | G06T 7/0085 |
| | | | 382/199 |

OTHER PUBLICATIONS

Gruetzemacher et al., "Using Deep Learning for Pulmonary Nodule Detection & Diagnosis", Deep Learning for Pulmonary Nodule Detection & Diagnosis, Twenty-second Americas Conference on Information Systems, San Diego, 2016, pp. 1-9.

"LUng Nodule Analysis 2016",https://luna16.grand-challenge.org/, Consortium for Open Medical Image Computing, 2012-2017, printed May 23, 2017, p. 1.

* cited by examiner

SURFACE-BASED OBJECT IDENTIFICATION

BACKGROUND

The present invention relates to surface-based object identification.

Machine learning, such as in neural networks, has been used for image identification of objects. For example, nodule (or cancer) detection based on CT images is known. In the past, 2D images were input into a neural network for nodule detection, as disclosed by Hua, Kai-Lung et al., in "Computer-Aided Classification of Lung Nodules on Computed Tomography Images via Deep Learning Technique", published by OncoTargets and therapy 8 (2015): 2015-2022. PMC. Web. 17 Oct. 2016, and by Richard Gruetzemacher and Ashish Gupta, in "Using Deep Learning for Pulmonary Nodule Detection & Diagnosis", published by Intelligence and Intelligent Systems (SIGODIS), 2016.11.8.

However, since the 2D (two-dimensional) images may sometimes not represent 3D (three-dimensional) morphological features of an object, the identification of the object with the 2D images may not be sufficiently precise. In addition, the 2D images require long training times due to their large data size.

Instead of the 2D images, 3D data of objects may be used for identification of the objects. Nevertheless, the training with the 3D data is more time consuming than with the 2D images.

SUMMARY

According to a first aspect of the present invention, provided is a method including: estimating a distribution of a plurality of orientations of a periphery of a target object, and identifying the target object based on the distribution. According to the first aspect, the identification of the target object may be accurately determined with less computational resources.

According to a second aspect of the present invention, provided is the method of the first aspect, wherein the plurality of orientations of the periphery of the target object correspond to orientations from a reference point to the periphery of the target object. According to the second aspect, whether the target object is a nodule or not may be accurately determined with less computational resources.

According to a third aspect of the present invention, provided is the method of the first or second aspect, wherein the periphery of the target object corresponds to an isosurface of voxel data of the target object. According to the second aspect, the identification of the target object may be accurately determined with less computational resources.

According to a fourth aspect of the present invention, provided is the method of any one of the first to third aspects, wherein the isosurface includes a plurality of sub-regions, and each of the plurality of orientations of the periphery of the target object is an orientation of each of the plurality of sub-regions. According to the fourth aspect, the identification of the target object may be accurately determined with less computational resources.

According to a fifth aspect of the present invention, provided is the method of any one of the first to fourth aspects, wherein the distribution of the plurality of orientations of the periphery of the target object is a distribution of cosine values of an angle between a normal vector and a center vector, the normal vector being of each sub-region of the plurality of sub-regions, and the center vector made between the center of target object and the center of each sub-region. According to the fifth aspect, the identification of the target object may be accurately determined with less computational resources.

The first-fifth aspects above may also include an apparatus performing the foregoing methods, and a computer program product storing instructions embodied on a computer-readable medium or programmable circuitry, for causing a processor or the programmable circuitry to perform the foregoing methods.

The summary clause does not necessarily describe all features of the embodiments of the present invention. Embodiments of the present invention may also include sub-combinations of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
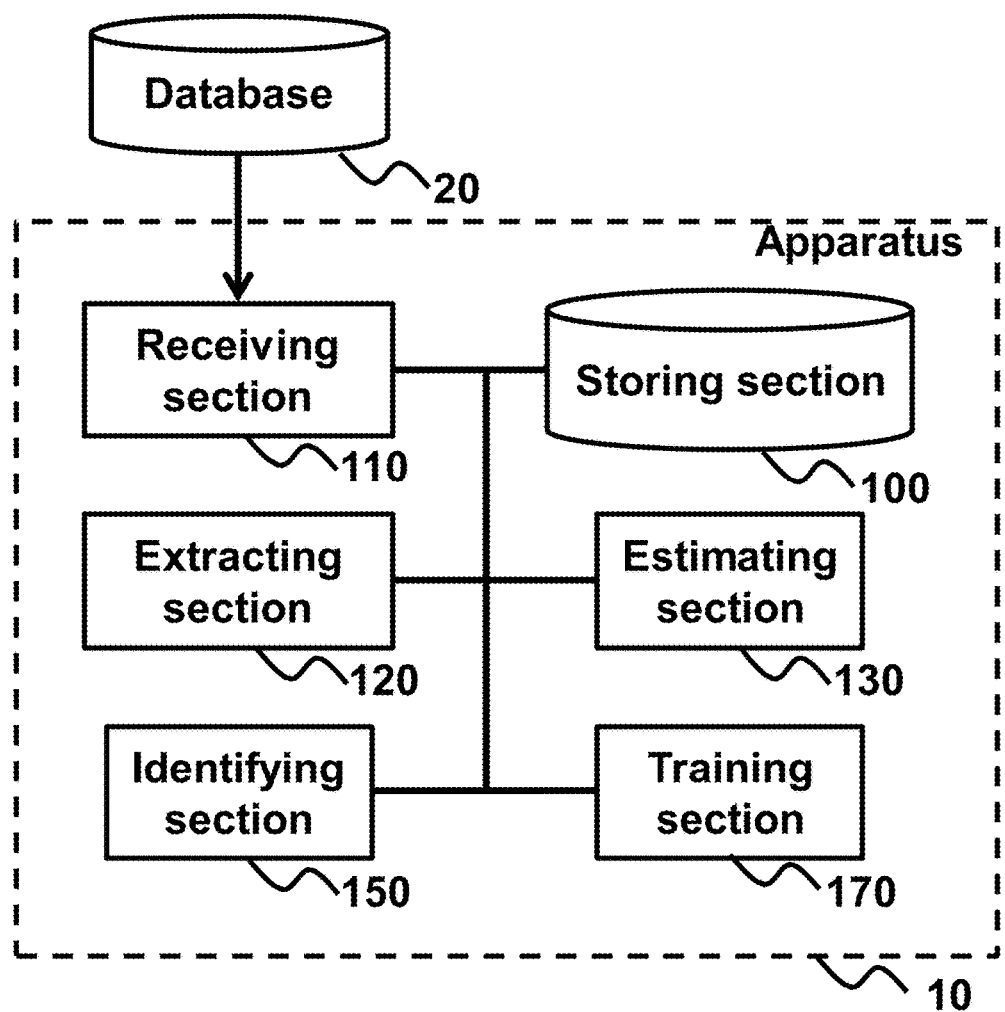
FIG. 1 shows an exemplary configuration of an apparatus, according to an embodiment of the present invention.

FIG. 1 shows an exemplary configuration of an apparatus 10, according to an embodiment of the present invention. The apparatus 10 may identify a target object based on a periphery of the target object. In an embodiment, the apparatus 10 may receive voxel data of a body tissue as the target object, and identify whether the body tissue is a nodule or not based on a periphery of the body tissue, by utilizing a neural network.

The apparatus 10 may include a processor and/or programmable circuitry. The apparatus 10 may further include one or more computer readable mediums collectively including instructions. The instructions may be embodied on the computer readable medium and/or programmable circuitry.

The instructions, when executed by the processor or the programmable circuitry, may cause the processor or the programmable circuitry to operate as a plurality of operating sections. Thereby, the apparatus 10 may be regarded as including a storing section 100, a receiving section 110, an extracting section 120, an estimating section 130, an identifying section 150, and a training section 170.

The storing section 100 may store information used for the processing that the apparatus 10 performs. The storing section 100 may also store a variety of data/instructions used for operations of the apparatus 10. One or more other elements in the apparatus 10 (e.g., the receiving section 110, the extracting section 120, the estimating section 130, the identifying section 150, the training section 170, etc.) may communicate data directly or via the storing section 100 as necessary. The storing section may be implemented by a volatile or non-volatile memory of the apparatus 10. In one embodiment, the storing section 100 may store weights trained for a neural network.

The receiving section 110 may receive three-dimensional data of a target object. In an embodiment, the receiving section may receive voxel data of the target object from a database 20 or a user of the apparatus 10. The receiving section 110 may also receive three-dimensional data of training objects and identifications of the training objects from the database 20.

The extracting section 120 may extract a periphery of the target object from the three-dimensional data of the target object. In an embodiment, the extracting section 120 may extract an isosurface of voxel data of the target object as the periphery of the target object. The extracting section 120 may extract peripheries of the training objects from the three-dimensional data of the training objects.

The estimating section 130 may estimate a distribution of a plurality of orientations of the periphery of the target object. In an embodiment, the estimating section 130 may generate a histogram of the plurality of orientations of the periphery of the target object as the distribution of the plurality of orientations of the periphery of the target object. The estimating section 130 may also estimate distributions of a plurality of orientations of the peripheries of the training objects.

The identifying section 150 may identify the target object based on the distribution estimated by the estimating section 130. In an embodiment, the identifying section 150 may identify the target object by inputting the distribution into a neural network.

The training section 170 may train a neural network with the training data including the plurality of training sets. In an embodiment, each training set may include the distribution of a plurality of orientations of the periphery of one training object and an identification of the one training object.

Figure 2:
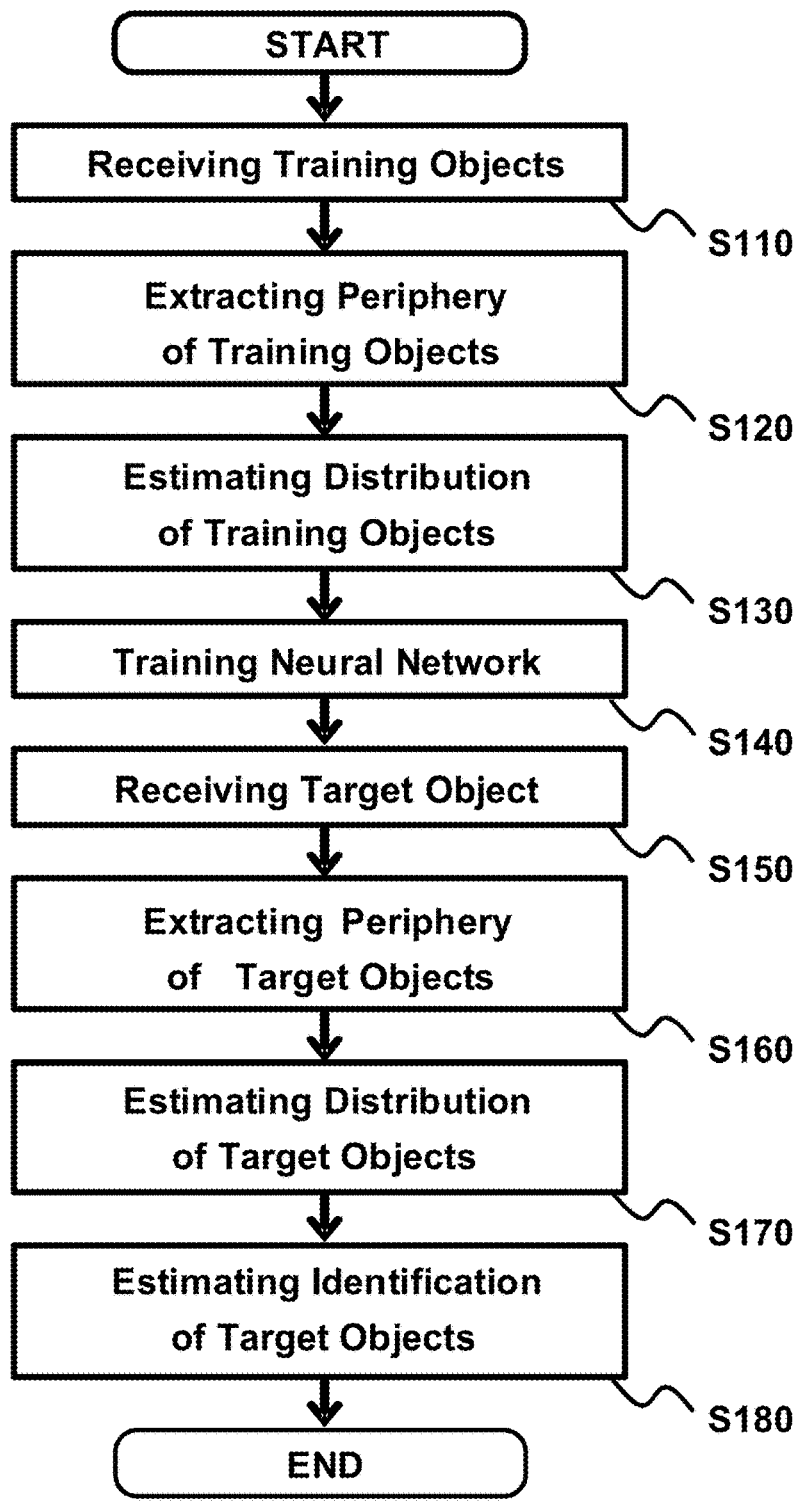
FIG. 2 shows a flowchart of operational steps taken by an apparatus, according to an embodiment of the present invention.

FIG. 2 shows a flowchart of operational steps taken by an apparatus, according to an embodiment of the present invention. The present embodiment describes an example in which an apparatus, such as the apparatus 10, performs the operations from S110 to S180, as shown in FIG. 2. The apparatus may perform a training phase throughout S110-S140, in which a neural network is trained, and a test phase throughout S150-S180 in which the target object is identified by the trained neural network. In an embodiment, the apparatus may perform only the training phase or the test phase.

At S110, a receiving section, such as the receiving section 110, may receive three-dimensional data of a plurality of training objects. In an embodiment, the receiving section may receive voxel data of each training object of the plurality of training objects from a database, such as the database 20.

In an embodiment, the receiving section may receive voxel data of a body tissue (such as lung, liver, heart, stomach, intestine, blood vessel, bone, brain, other organs, etc.) as the training object from an MRI device, CT scanner, and/or other 3D imaging devices. For example, the receiving section may receive voxel data having 64 CT images, each image being a 64×64 pixel slice of a lung, as training objects.

In an embodiment, the receiving section may receive 2D images of each training object of the plurality of training objects from the database. For example, the receiving section may receive CT images for slices of lungs from the database as the plurality of training objects.

The receiving section may also receive identifications of the plurality of training objects. In an embodiment, the identification may be with respect to whether the target object belongs to a first class or a second class. In the embodiment, the first class may indicate that the target object is normal, and the second class may indicate that the target object is abnormal.

For example, the receiving section may receive whether a training object is a nodule (or cancer) or not as an identification of the training object for each of the plurality of training objects. The identification may be confirmed diagnoses of "nodule" or "not nodule" for the training objects, the confirmation made by medical doctors.

At S120, an extracting section, such as the extracting section 120, may extract peripheries of the training objects from the three-dimensional data of the training objects. The periphery may be a shape that represents an outer shape of a training/target object.

In an embodiment, the extracting section may extract an isosurface of voxel data of each training object as a periphery of each training object. In an embodiment, the isosurface of the voxel data may be a surface that consists of vertexes having a constant value or an approximately constant value in the voxel data. For example, the isosurface may be a surface having the same or approximately the same amount of 1H atoms extracted from the MRI voxel data.

In the embodiment, the extracting section may extract the isosurface by utilizing a marching cube algorithm. For example, the extracting section may transform each voxel in the voxel data of the training object into a vertex such that each vertex has a value of 0 or 1, based on a predetermined a cut-off value. The transformed vertexes form an array of cubes each including 8 vertexes having a value of 0 or 1. The estimating section may generate the isosurface by connecting vertexes having a value of 1, for example, by applying template cubes to the vertexes.

Figure 3A:
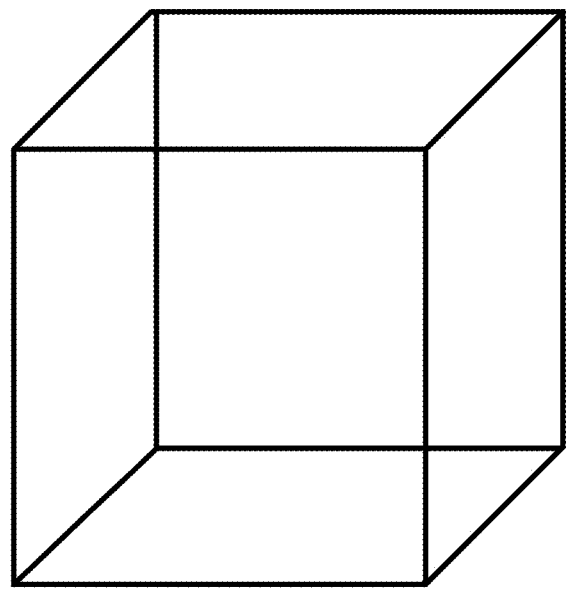
FIGS. 3A-3O show template cubes, according to an embodiment of the present invention.
Figure 3B:
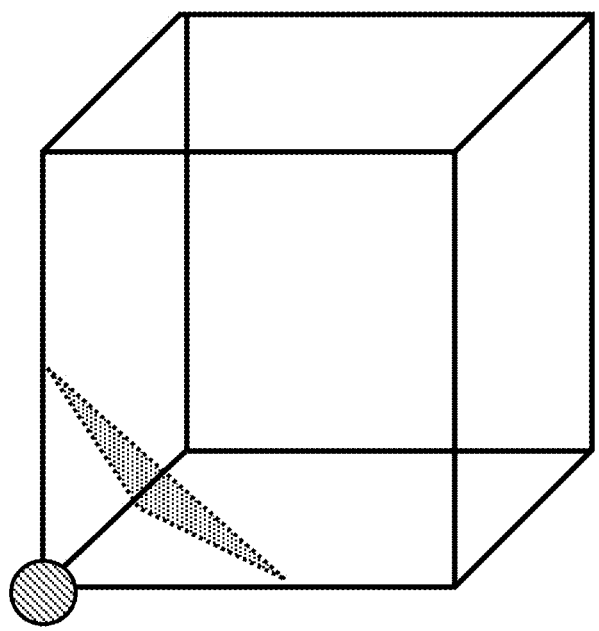
Figure 3C:
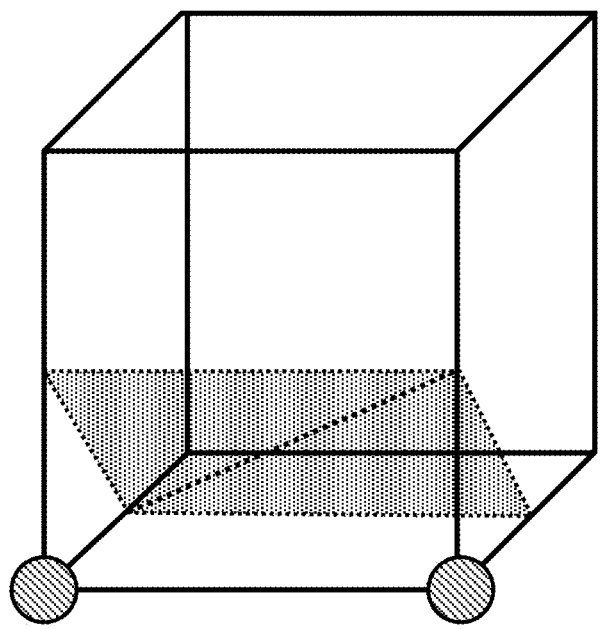
Figure 3D:
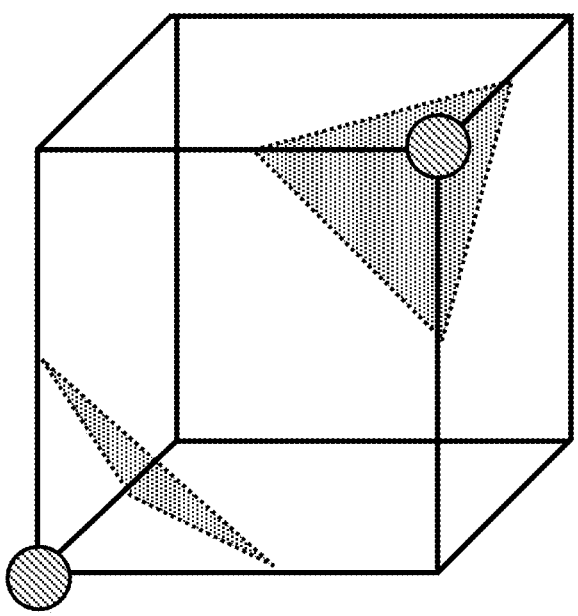
Figure 3E:
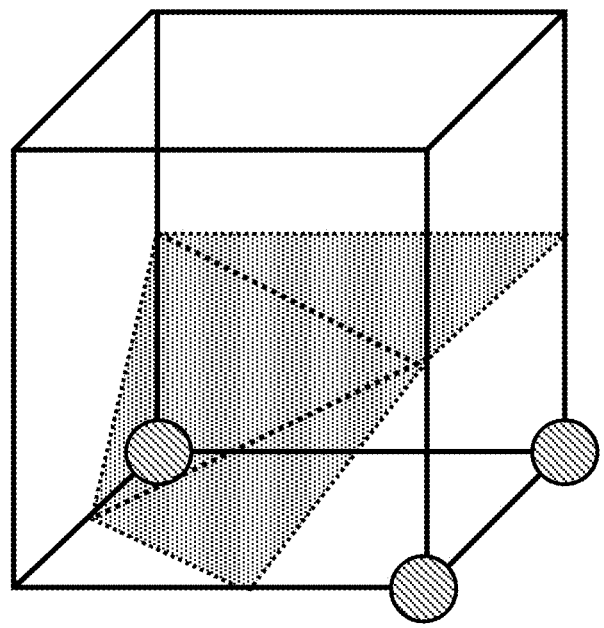
Figure 3F:
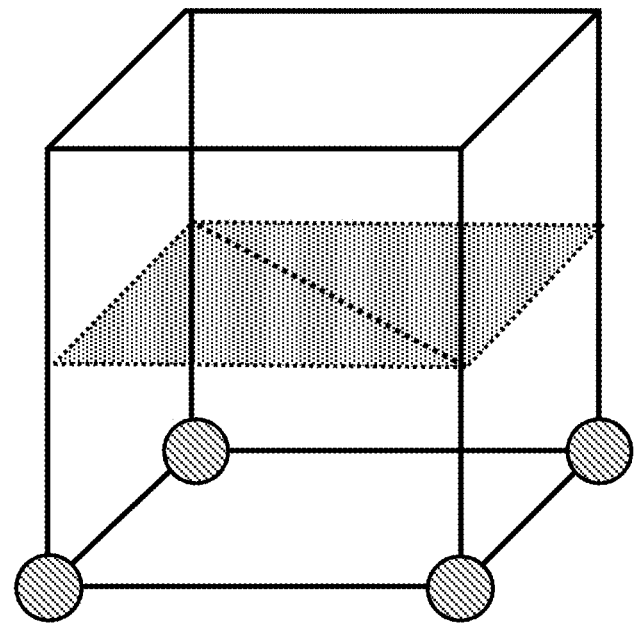
Figure 3G:
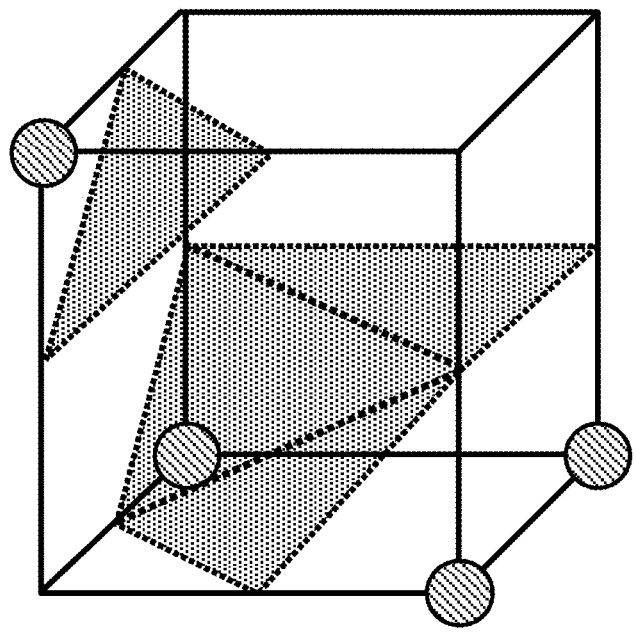
Figure 3H:
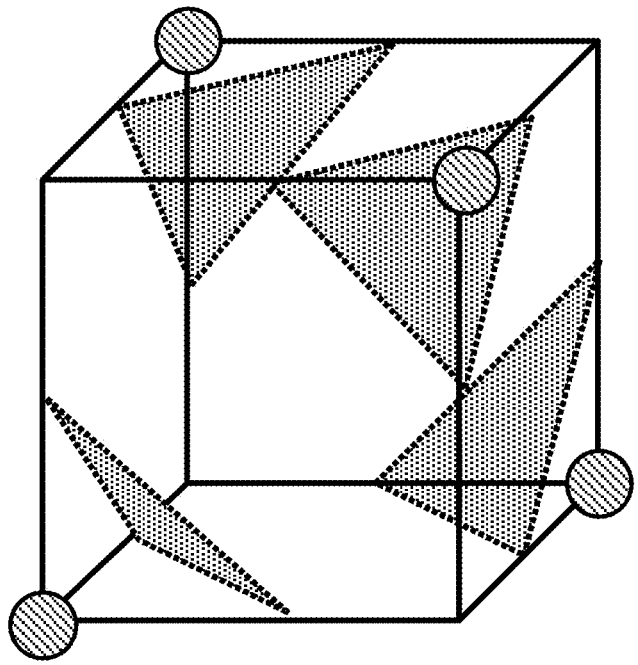
Figure 3I:
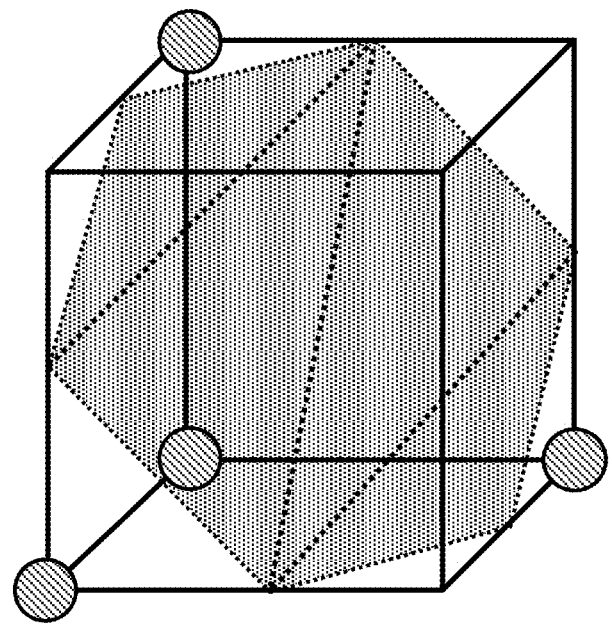
Figure 3J:
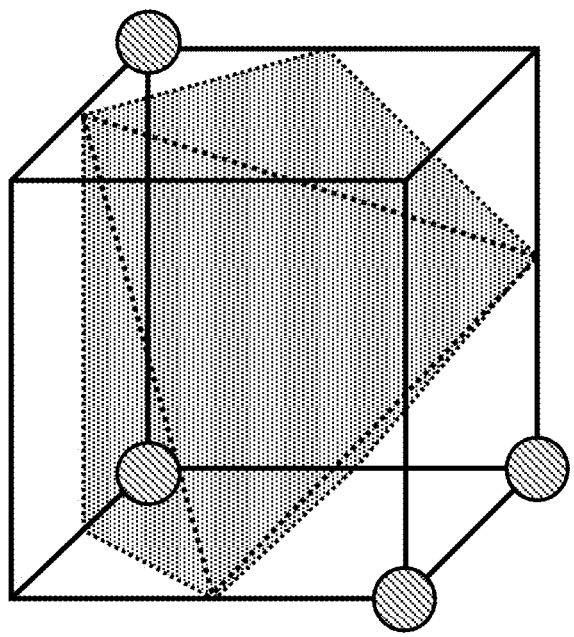
Figure 3K:
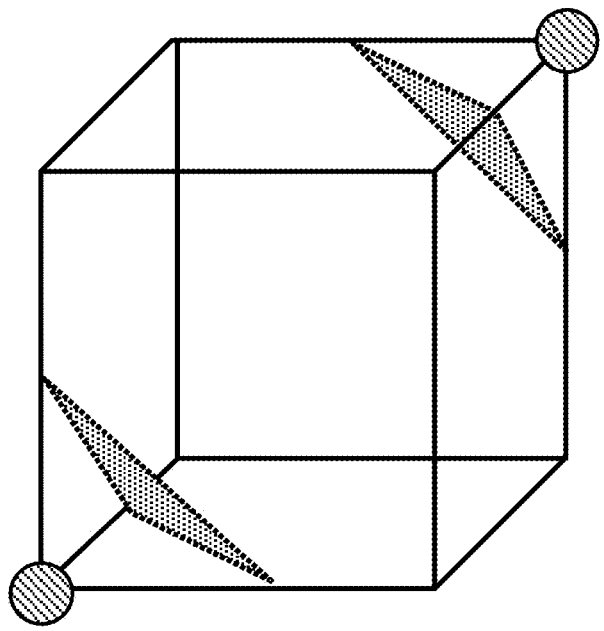
Figure 3L:
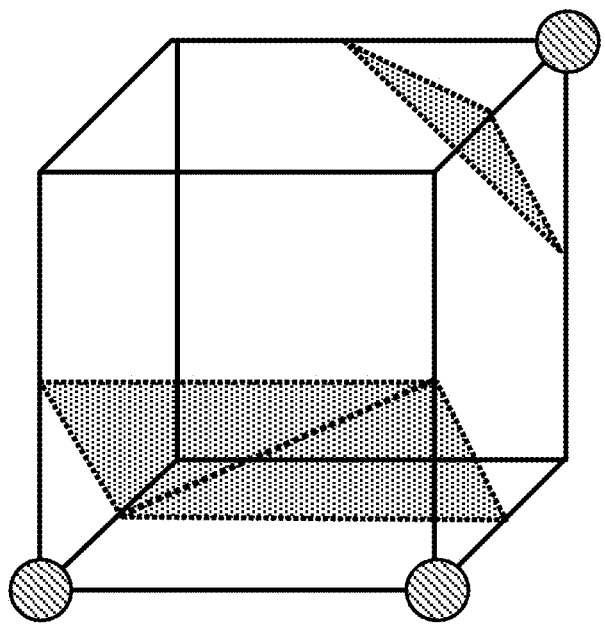
Figure 3M:
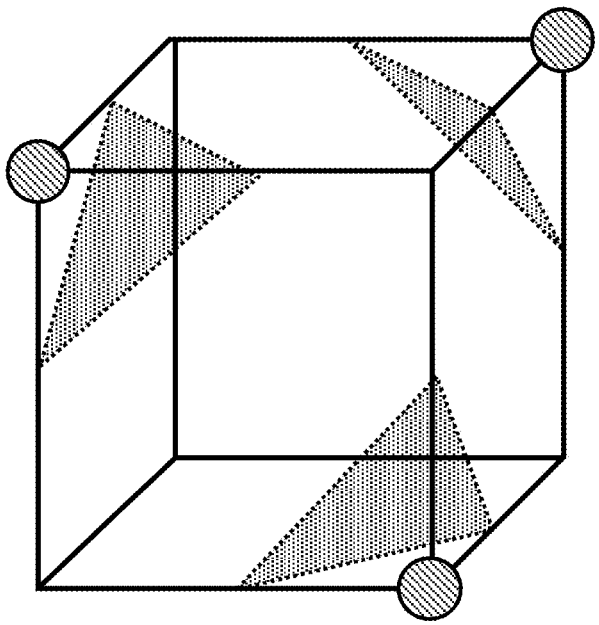
Figure 3N:
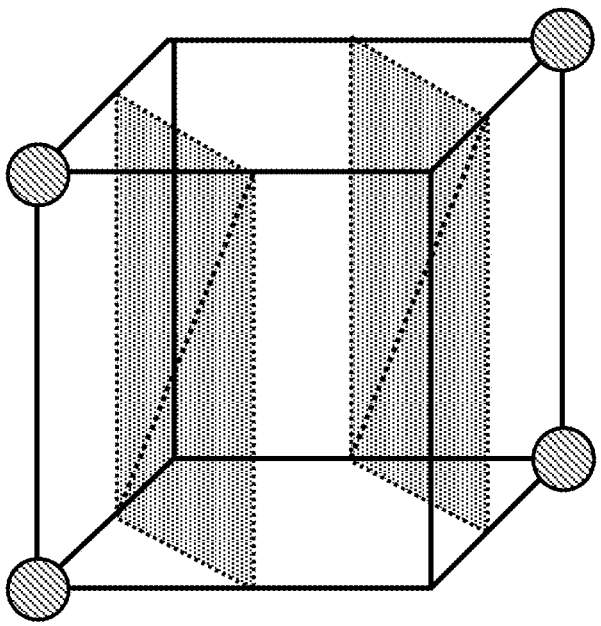
Figure 3O:
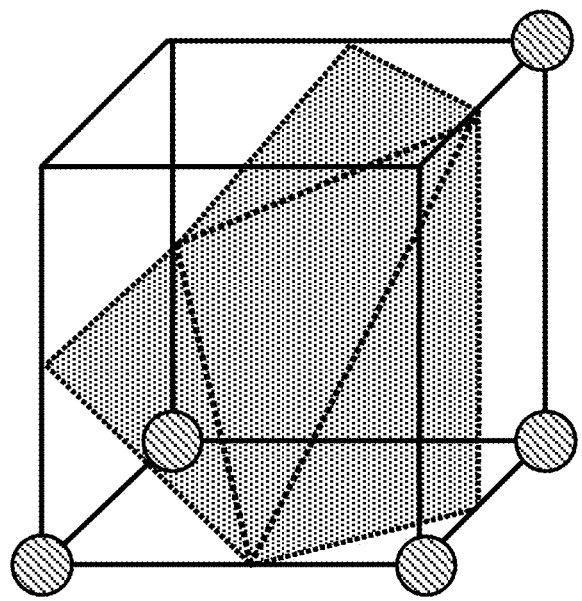

FIGS. 3A-3O show template cubes according to an embodiment of the present invention. 15 cubes shown in FIGS. 3A-3O may be used as the template cubes for a marching cube algorithm. In FIGS. 3A-3O, hatched points within the cubes correspond to vertexes having a value of 1, while other vertexes in the cubes correspond to vertexes having value of 0, and hashed surfaces correspond to a portion of the isosurface.

For example, if a cube in the transformed voxel data has 8 vertices having a value of 0, then the cube does not have an isosurface, as shown in FIG. 3A. If a cube in the transformed voxel data has 1 vertex having a value of 1 and 7 vertices having a value of 0, then the cube has a triangular isosurface, as shown in FIG. 3B. If a cube in the transformed voxel data has two adjacent vertices having a value of 1 and 6 vertices having a value of 0, then the cube has a rectangular isosurface as shown in FIG. 3C. The rectangular isosurface in FIG. 3C can be divided into two triangular isosurfaces.

Similarly, a variety of patterns of partial isosurfaces may be formed based on template cubes such as shown in FIGS. 3D-3O. The template cubes shown in FIGS. 3A-3O may cover all patterns of combinations of vertices having a value of 1 and vertices having a value of 0 of cubes formed by the transformed vertices.

Figure 4:
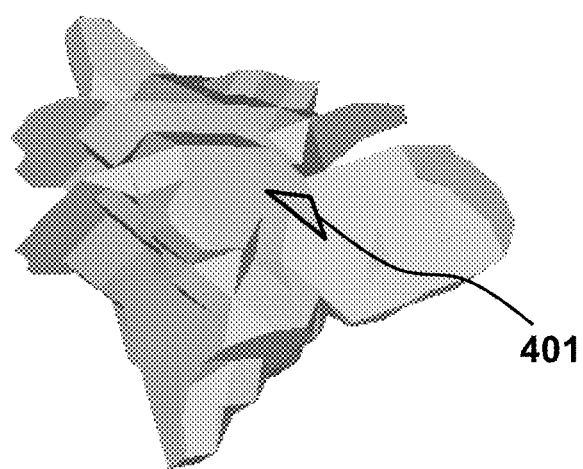
FIG. 4 shows a periphery of an object, according to an embodiment of the present invention.

FIG. 4 shows a periphery of an object according to an embodiment of the present invention. In an embodiment, the extracting section may extract the isosurface of the training object, such as shown in FIG. 4, based on the marching cube algorithm. The isosurface may include a plurality of sub-regions. Each sub-region of the plurality of sub-regions may be a triangle having vertices of a constant value in the voxel data of the training object. These sub-regions may correspond to the hatched triangular isosurface shown in FIGS. 3B-3O. One triangular sub-region 401 is indicated in FIG. 4.

In an embodiment, the extracting section may extract a single-layered isosurface of the training object by using a single cut-off value. In an embodiment, the extracting section may extract a layered isosurface of the training object by using one or more cut-off values.

In some alternative embodiments, the extracting section may extract the isosurface of the voxel data by methods other than the marching cube. For example, the extracting section may estimate 3D locations having a constant value in the voxel data by an interpolating algorithm, and connecting the estimated locations to generate the isosurface.

At S130, an estimating section, such as the estimating section 130, may estimate a distribution of a plurality of orientations of the peripheries of the training objects. In an embodiment, the estimating section may identify orientations of the isosurface of the training object. In the embodiment, the estimating section may identify an orientation of each of the plurality of sub-regions of the isosurface. In the embodiment of FIG. 4, the estimating section may determine orientations of all or a part of the sub-regions of the isosurface. The orientation of the sub-region may be identified by one or two parameters.

The estimating section may first estimate orientations of the periphery of the training object from a reference point to the periphery of the training object. In an embodiment, the reference point may be a center of the training object.

In an embodiment, the center of the training object may be a center of a three-dimensional shape consisting of the cubes that include at least one sub-region, a center of a bounding box of cubes that include at least one sub-region, or, a center of a three-dimensional shape covered by the isosurface. The estimating section may determine the center of the training object by taking density (e.g., an amount of 1H in MRI voxel data) of the training object into account.

Figure 5:
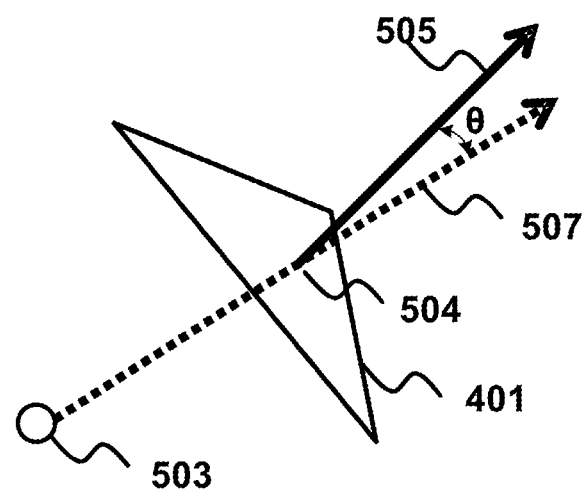
FIG. 5 shows a sub-region, according to an embodiment of the present invention.

FIG. 5 shows a sub-region according to an embodiment of the present invention. The estimating section may estimate a center vector made between a center of a training object and a center of each sub-region. In the embodiment of FIG. 5, the estimating section may estimate the center vector (shown as a dotted arrow) made between a center 503 of the training object and a center 504 of a sub-region 401. In an alternative embodiment, the estimating section may estimate a center vector made between a center of a training object and one vertex of each sub-region.

The estimating section may also estimate an angle between the center vector and normal vectors of each sub-region of the plurality of sub-regions. In an embodiment, the estimating section may estimate cosine values of an angle between a normal vector and the center vector of each sub-region. In an embodiment, the estimating section may estimate sine values of an angle between the normal vector and the center vector of each sub-region.

The estimating section may further estimate a second angle between a plane made by the center vector and the normal vector of each sub-region, and, a predetermined reference plane. The estimating section may further use the second angle, cosine value of the second angle, and/or sine value of the second angle as at least a part of the orientation of each sub-region.

The estimating section may generate a distribution of the plurality of orientations of the periphery of the training object, based the estimated cosine values, the sine values, and/or the angles themselves. In an embodiment, the estimating section may accumulate cosine values of the angle between a normal vector and a center vector of the plurality of sub-regions to generate the distribution.

In an embodiment, the estimating section may accumulate sine values of the angle between a normal vector and a center vector of the plurality of sub-regions to generate the distribution. In an embodiment, the estimating section may accumulate the angle values between a normal vector and a center vector of the plurality of sub-regions to generate the distribution.

In an embodiment, the estimating section may generate a histogram of the accumulated cosine values, sine values, and/or, angles made by the normal vector and the center vector of the plurality of sub-regions of the isosurface of the training object, as the distribution. In an embodiment, the estimating section may use the second angle, cosine value of the second angle, and/or sine value of the second angle for the estimation of the distribution.

Figure 6:
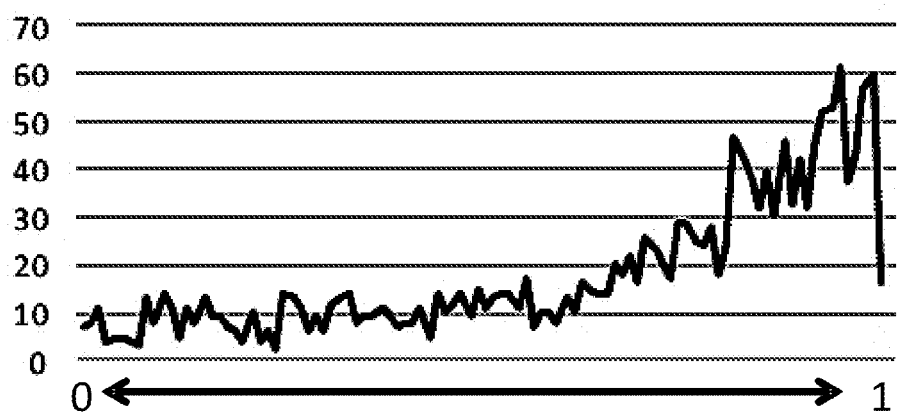
FIG. 6 shows a distribution, according to an embodiment of the present invention.

FIG. 6 shows a distribution according to an embodiment of the present invention. The estimating section may generate the histogram of cosine values of an angle between a normal vector and a center vector of the plurality of sub-regions as shown in FIG. 6 as the distribution. A horizontal axis corresponds to bins of a cosine value and a vertical axis corresponds to counts or ratio of each cosine value in FIG. 6.

Nodules may in general take a sphere shape, of which orientations of sub-regions give cosine values of 1. Therefore, if a training object is a nodule, a distribution of the training object typically has a peak near 1.

In an embodiment, the estimating section may further estimate the distribution of the length of the center vectors of the plurality of sub-regions, in addition to the distribution of the orientations.

In an alternative embodiment, the estimating section may further calculate a length of the center vector for each sub-region. In the embodiment, the estimating section may generate a distribution of the length of the center vectors of the plurality of sub-regions.

In an alternative embodiment, the estimating section may identify an orientation of each sub-region of the isosurface with angles made with adjacent sub-regions. For example, the estimating section may generate a distribution of adjacent angles made with each sub-region and adjacent sub-regions, a distribution of cosine values of the adjacent angles, and/or a distribution of sine values of the adjacent angles.

In an alternative embodiment, the estimating section may generate a known distribution (such as Gaussian distribution) that approximates the histogram. In the embodiment, the estimating section may use the known distribution instead of the histogram for S140.

At S140, a training section such as the training section 170 may train a neural network with a plurality of training sets. Each of the plurality of training sets may include a distribution (e.g., a histogram) of each training object estimated at S130 and an identification of each training object received at S110.

In an embodiment, each training set may include the histogram of orientations of the isosurface of each training object and an identification of whether each training object (e.g., a body tissue) is a nodule or not. In an embodiment, each training set may include a mean value and a variance derived from the distribution, instead of the distribution itself.

In an embodiment, the training section may determine weights between each node in a layer and each node in another layer in the neural network. In an embodiment, the training section may determine the weights by performing back propagation. In an embodiment, the neural network may be a Convolutional Neural Network (CNN).

Figure 7:
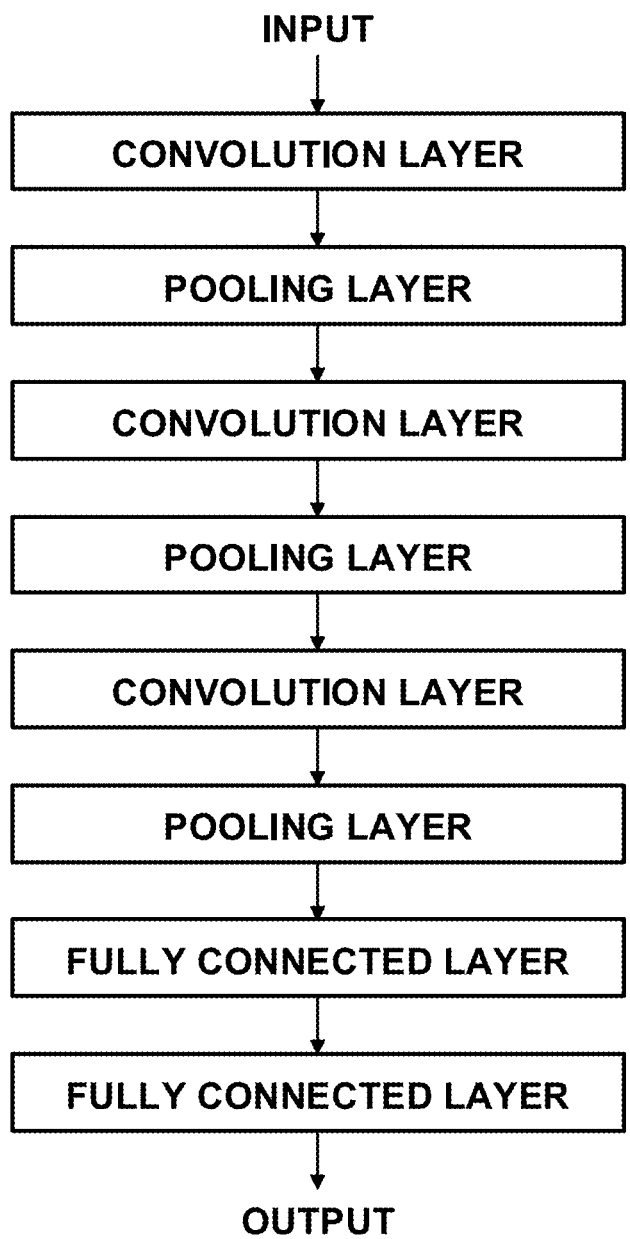
FIG. 7 shows a CNN, according to an embodiment of the present invention.

FIG. 7 shows a CNN according to an embodiment of the present invention. The training section may train a neural network represented by the structure of FIG. 7. As shown in the drawing, the neural network may include a plurality (e.g., three) of groups of convolution layers and pooling layers, and at least one fully connected layer. The convolution layers may be layers that perform convolution by performing a filtering process on the input, and may include a plurality of neurons corresponding to the plurality of filters.

The pooling layers may be layers that apply a rectangular filter for extracting a maximum value of the input, and may include a plurality of neurons corresponding to the plurality of rectangular filters. The at least one fully connected layer may include a plurality of layers that each have a plurality of neurons, and the neurons may be connected to each other between each layer.

The resultant output from the lowest pooling layer may be input to a plurality (e.g., two) of fully connected layers. The output result from the fully connected layer may be output as the output of the neural network. In one embodiment, the training section may train at least some weights between nodes in the convolution layers, the pooling layers, and the fully connected layers.

Since a distribution (e.g., histogram) is a 1D-feature, the CNN may be a 1D-CNN having 1D-convolution layers and 1D-pooling layers. The 1D-CNN may extract features of the distribution regardless of minor variations or shifts in the distribution. Therefore, the trained CNN may extract rough features of the distribution.

At S150, the receiving section may receive three-dimensional data of a target object. The target object may be an object that has not yet been identified. In an embodiment, the receiving section may receive voxel data of the target object from the database or a user of the apparatus. The receiving section may receive voxel data of a body tissue (such as lung, liver, heart, stomach, intestine, blood vessel, bone, brain, etc.) as the target object from an MRI device, CT scanner, and/or other 3D imaging devices.

At S160, the extracting section may extract a periphery of the target object. The extracting section may perform the operation of S160 in the same or similar manner as the operation of S120.

At S170, the estimating section may estimate a distribution of a plurality of orientations of the periphery of the target object. The estimating section may perform the operation of S170 in the same or similar manner as the operation of S130.

At S180, an identifying section such as the identifying section 150 may identify the target object based on the distribution estimated at S170 using the neural network trained at S140. In an embodiment, the identifying section may process a calculation of the neural network.

The neural network may receive the histogram as input of a 1D-CNN. In an embodiment, the histogram frequency of similar isosurfaces may be counted by different nearby bins due to variation in the orientations (e.g., cosine values). The variation in the orientations may be absorbed by 1D-Convolution and 1D-pooling.

The neural network may output an identification of the target object. In an embodiment, the neural network may output a value of 0 or 1, where 0 indicates that the target object is a nodule, and 1 indicates that the target object is not a nodule. In an embodiment, the neural network may output a possibility that the target object is a nodule.

As explained in relation to the foregoing embodiments, the apparatus may identify a target object by utilizing information of orientations of a periphery of the target object. The information of orientation of a periphery of the target object may be more informative than 2D images of the target object as to 3D morphological features.

The information of orientation of a periphery of the target object is represented by 1D information, such as a distribution (e.g., histogram), and has less data volume than 3D data of the target object. Thereby, the apparatus can accurately identify the target object with less computational resources. For example, the apparatus can determine whether a body tissue is a nodule or not based on a periphery of the body tissue derived from voxel data of the body tissue.

In the foregoing embodiment, the training section trains a neural network. In some alternative embodiments, the training section may train other learning machines. In an embodiment, the training section may train a support vector machine (or SVM) with the training data, and the identifying section may identify the target object with the trained SVM.

In the foregoing embodiment, the estimating section may use a predetermined center of the training/target objects. In some alternative embodiments, the estimating section may search a center of the training object such that a variation of the distribution (e.g., a histogram) of orientations of a periphery of the training object is minimized. Thereby, the estimating section may generate the distribution that indicates a feature of a spherical shape.

Figure 8:
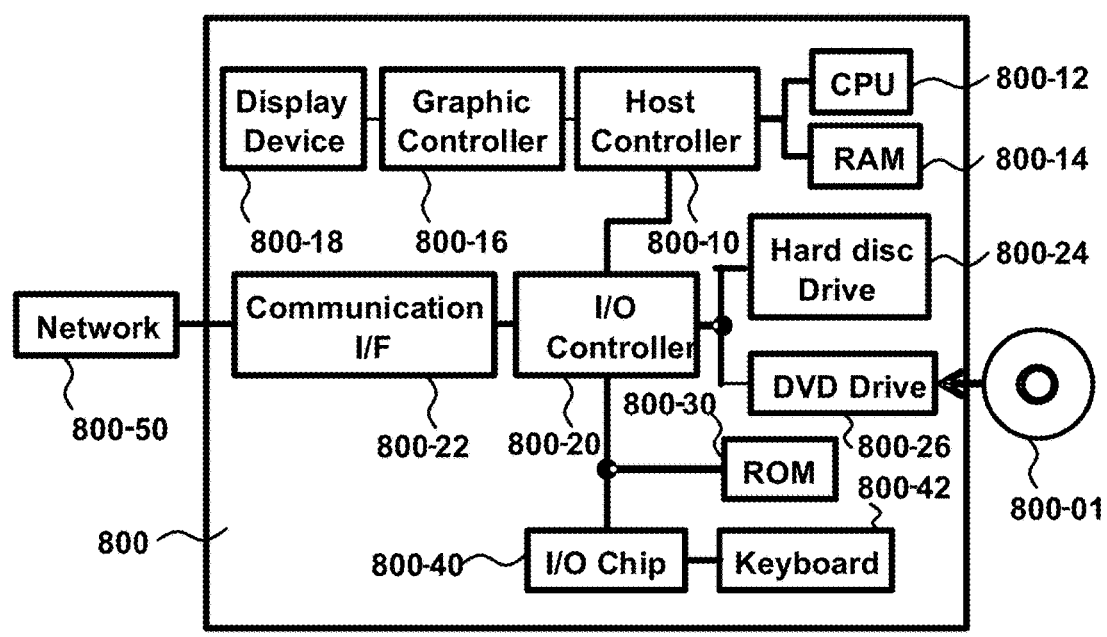
FIG. 8 shows an exemplary hardware configuration of a computer that functions as a system, according to an embodiment of the present invention.

FIG. 8 shows an exemplary hardware configuration of a computer that may be configured for cloud service utilization, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 receives image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby receiving the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A method, comprising:
   estimating a distribution of a plurality of orientations of a periphery of a target object, wherein the plurality of orientations of the periphery of the target object correspond to orientations from a reference point to the periphery of the target object, wherein the reference point is a center of the target object, wherein the periphery of the target object corresponds to an isosurface of voxel data of the target object, wherein the distribution of the plurality of orientations of the periphery of the target object comprises a histogram of the plurality of orientations of the periphery of the target object, and wherein the isosurface is a surface having the same or approximately the same amount of 1H atoms extracted from MRI voxel data;
   training a neural network with a plurality of training sets, each training set including a distribution of a plurality of orientations of a training periphery of a training object and an identification of the training object; and
   identifying the target object based on the distribution, wherein identifying the target object based on the distribution is performed by using the neural network.

2. The method of claim 1, wherein the isosurface includes a plurality of sub-regions, and each of the plurality of orientations of the periphery of the target object is an orientation of each of the plurality of sub-regions.

3. The method of claim 2, wherein each sub-region is a triangle having vertices of a constant value in the voxel data of the target object.

4. The method of claim 3, wherein the distribution of the plurality of orientations of the periphery of the target object is a distribution of cosine values of an angle between a normal vector and a center vector, the normal vector being of each sub-region of the plurality of sub-regions, and the center vector made between the center of target object and the center of the each sub-region.

5. The method of claim 1, wherein the neural network is a convolutional neural network.

6. The method of claim 1, wherein the target object is a body issue.

7. A computer system, comprising:
one or more computer processors, one or more non-transitory computer-readable storage media, and program instructions stored on one or more of the non-transitory computer-readable storage media for execution by at least one of the one or more computer processors, the program instructions, when executed by the at least one of the one or more computer processors, causing the computer system to perform a method comprising:
estimating a distribution of a plurality of orientations of a periphery of a target object, wherein the plurality of orientations of the periphery of the target object correspond to orientations from a reference point to the periphery of the target object, wherein the reference point is a center of the target object, wherein the periphery of the target object corresponds to an isosurface of voxel data of the target object, wherein the distribution of the plurality of orientations of the periphery of the target object comprises a histogram of the plurality of orientations of the periphery of the target object, and wherein the isosurface is a surface having the same or approximately the same amount of 1H atoms extracted from MRI voxel data;
training a neural network with a plurality of training sets, each training set including a distribution of a plurality of orientations of a training periphery of a training object and an identification of the training object; and
identifying the target object based on the distribution, wherein identifying the target object based on the distribution is performed by using the neural network.

8. The apparatus of claim 7, wherein the isosurface includes a plurality of sub-regions, and each of the plurality of orientations of the periphery of the target object is an orientation of each of the plurality of sub-regions.

9. The apparatus of claim 8, wherein each sub-region is a triangle having vertices of a constant value in the voxel data of the target object.

10. The apparatus of claim 9, wherein the distribution of the plurality of orientations of the periphery of the target object is a distribution of cosine values of an angle between a normal vector and a center vector, the normal vector being of each sub-region of the plurality of sub-regions, and the center vector made between the center of target object and the center of the each sub-region.

11. A computer program product, comprising:
one or more non-transitory computer-readable storage devices and program instructions stored on at least one of the one or more non-transitory computer-readable storage devices for execution by at least one or more computer processors of a computer system, the program instructions, when executed by the at least one of the one or more computer processors, causing the computer system to perform a method comprising:
estimating a distribution of a plurality of orientations of a periphery of a target object, wherein the plurality of orientations of the periphery of the target object correspond to orientations from a reference point to the periphery of the target object, wherein the reference point is a center of the target object, wherein the periphery of the target object corresponds to an isosurface of voxel data of the target object, wherein the distribution of the plurality of orientations of the periphery of the target object comprises a histogram of the plurality of orientations of the periphery of the target object, and wherein the isosurface is a surface having the same or approximately the same amount of 1H atoms extracted from MRI voxel data;
training a neural network with a plurality of training sets, each training set including a distribution of a plurality of orientations of a training periphery of a training object and an identification of the training object; and
identifying the target object based on the distribution, wherein identifying the target object based on the distribution is performed by using the neural network.

12. The computer program product of claim 11, wherein the isosurface includes a plurality of sub-regions, and each of the plurality of orientations of the periphery of the target object is an orientation of each of the plurality of sub-regions.

13. The computer program product of claim 12, wherein each sub-region is a triangle having vertices of a constant value in the voxel data of the target object.

* * * * *